US007711002B2

(12) United States Patent
Mukherjee et al.

(10) Patent No.: US 7,711,002 B2
(45) Date of Patent: May 4, 2010

(54) TRANSCODING SMS-BASED STREAMED MESSAGES TO SIP-BASED IP SIGNALS IN WIRELESS AND WIRELINE NETWORKS

(75) Inventors: Atanu Mukherjee, Bellevue, WA (US); Chao-Chi Chen, Sammamish, WA (US); Francois Frederic Ozog, Adainville (FR)

(73) Assignee: Link Us All, LLC, Reno, NV (US)

( * ) Notice: Subject to any disclaimer, the term of this patent is extended or adjusted under 35 U.S.C. 154(b) by 123 days.

(21) Appl. No.: 10/183,031

(22) Filed: Jun. 25, 2002

(65) Prior Publication Data

US 2003/0026289 A1 Feb. 6, 2003

Related U.S. Application Data

(60) Provisional application No. 60/301,249, filed on Jun. 26, 2001.

(51) Int. Cl.
*H04L 12/26* (2006.01)
(52) U.S. Cl. ...................................... 370/467
(58) Field of Classification Search ................. 370/465, 370/466, 467
See application file for complete search history.

(56) References Cited

U.S. PATENT DOCUMENTS

| 5,289,179 | A | 2/1994 | Beeson, Jr. et al. |
| 5,309,501 | A | 5/1994 | Kozik et al. |
| 5,329,573 | A | 7/1994 | Chang et al. |
| 5,889,474 | A | 3/1999 | LaDue |
| 6,161,008 | A | 12/2000 | Lee et al. |
| 6,185,208 | B1 | 2/2001 | Liao |
| 6,208,633 | B1 | 3/2001 | Jouppila et al. |
| 6,226,277 | B1 | 5/2001 | Chuah |
| 6,301,609 | B1 | 10/2001 | Aravamudan et al. |
| 6,516,197 | B2 | 2/2003 | Havinis et al. |
| 6,658,011 | B1 | 12/2003 | Sevanto et al. |
| 6,680,943 | B1 | 1/2004 | Gibson et al. |

(Continued)

FOREIGN PATENT DOCUMENTS

EP    1 071 295    1/2001

(Continued)

OTHER PUBLICATIONS

"Mobile Presence Bringing you Closer", Jun. 2001, printed from www.hotsip.com/documents/mobile_presence_white_paper.pdf on Jan. 17, 2003.

(Continued)

*Primary Examiner*—Melvin Marcelo
(74) *Attorney, Agent, or Firm*—Buchanan Ingersoll & Rooney PC

(57) ABSTRACT

A communication gateway for communicating presence information between a connectionless packet-switched signaling network and an Internet Protocol (IP) network includes a message bearer configured to receive and send messages over a connectionless packet-switched signaling network and a translator, in communication with the message bearer, operable to translate messages received from the connectionless packet-switched signaling network into messages suitable for transport over an IP network and operable to translate messages received from the IP network into messages suitable for transport over the connectionless packet-switched signaling network.

45 Claims, 3 Drawing Sheets

U.S. PATENT DOCUMENTS

| | | | |
|---|---|---|---|
| 6,804,552 B2 * | 10/2004 | Thompson et al. | 607/2 |
| 6,804,558 B2 | 10/2004 | Haller et al. | |
| 6,940,847 B1 | 9/2005 | Glitho et al. | |
| 6,996,076 B1 | 2/2006 | Forbes et al. | |
| 2001/0051787 A1 | 12/2001 | Haller et al. | |
| 2002/0013613 A1 | 1/2002 | Haller et al. | |
| 2002/0052539 A1 | 5/2002 | Haller et al. | |
| 2002/0077116 A1 | 6/2002 | Havinis et al. | |
| 2002/0082665 A1 | 6/2002 | Haller et al. | |
| 2003/0018704 A1 * | 1/2003 | Polychronidis et al. | 709/202 |

FOREIGN PATENT DOCUMENTS

| | | |
|---|---|---|
| EP | 1 071 295 A2 | 1/2001 |
| EP | 1 104 964 | 6/2001 |
| EP | 1 104 964 A1 | 6/2001 |
| WO | 00/64110 | 10/2000 |

OTHER PUBLICATIONS

"Mobile Presence Based on SIP Proven Successful", Jun. 19, 2001, printed from www.hotsip.com/news/one.asp?id=1270&showinfotype=news, on Jan. 17, 2003.

"SIP Extensions for Presence", Mar. 2, 2001, IEEE Internet Draft, pp. 1-39.

"News", Hotsip News, printed from www.hotsip.com/news/>, on Jan. 17, 2003.

Written Opinion dated Apr. 26, 2004, from PCT Application No. PCT/US02/20305.

International Preliminary Examination Report, PCT/US02/20305, filed on Sep. 9, 2004.

International Search Report, PCT/US02/20222, Feb. 6, 2003.

Hotsip, Mobile Presence Bringing You Closer, Jun. 2001, printed from www.hotsip.com/documents/mobile_presence_white_paper.pdf on Jan. 17, 2003.

Hotsip, "Mobile Presence Based on SIP Proves Successful", Jun. 19, 2001, printed from www.hotsip.com/news/one.asp?id=1270&showinfotype=news, on Jan. 17, 2003.

Internet Engineering Task Force Internet Draft, "SIP Extensions for Presence", Mar. 2, 2001, pp. 1-39.

Hotsip News, "News", printed from www.hotsip.com/news/>, on Jan. 17, 2003.

PCT International Search Report, PCT/US 02/20305, International filing date Jun. 25, 2002, date Search Report mailed Apr. 22, 2003.

Antonella Napolitano, et al., "Evolution of the GSM Platform", 1998, p. 409-413.

Insik Hong, et al., "The Implementation of Electronic Money for E-Commerce Using Java Card", 2001, p. 1369-1372.

Written Opinion, PCT/US02/20305, date mailed Apr. 26, 2004.

International Preliminary Examination Report, PCT/US02/20305, date of mailing Sep. 9, 2004.

Written Opinion, PCT/US02/20222, Mar. 17, 2005.

CDMA Development Group, "*Smart Card Stage I Description*", ver. 1.1, Document #43, May 22, 1996.

3GPP TS 21.111, "*3rd Generation Partnership Project; Technical Specification Group Terminals; USIM and IC card Requirements*", version 4.0, 2001, pp. 1-15.

3GPP2, "*Removable User Identity Module (R-UIM) for cdma2000 Spread Spectrum Systems*", Jun. 9, 2000, pp. 1-97.

"Wireless Identity Module", Version Jul. 12, 2001.

"Java Card™ 2.1 Runtime Environment (JCRE) Specification", Jun. 7, 1999, Final Revision 1.1.

Digital cellular telecommunications system (Phase2+); Specification of the SIM Application Toolkit for the Subscriber Identity Module—Mobile Equipment (SIM—ME) interface (GSM 11.14 Version 5.2.0), Dec. 1996, pp. 1-56.

(GSM 11.11 version 5.0.0) Dec. 1995, pp. 33-77.

M. Handley et al. "SIP: Session Initiation Protocol" RFC2543, Mar. 1990, pp. 1-90.

Information technology—Identification cards—Integrated circuit(s) cards with contacts—"Electronic signals and transmission protocols" Part 3, International Standard ISO/IEC 7816-3:1997 (E), pp. i-iv, & 1-28.

G. Richter, "A Study of the SIM Application Toolkit", Nov. 2001, EPN820 Advanced Computer Networks, pp. 1-121.

(GSM 03.40 version 7.40 Release 1998) Digital Cellular Telecommunications system (Phase 2+); Technical realization of the Short Message (SMS), pp. 1-59.

International Preliminary Examination Report, PCT/US02/20222, date of mailing Aug. 17, 2005.

* cited by examiner

TRANSCODING SMS-BASED STREAMED MESSAGES TO SIP-BASED IP SIGNALS IN WIRELESS AND WIRELINE NETWORKS

CROSS-REFERENCE TO RELATED APPLICATIONS

This non-provisional patent application claims priority to U.S. Pat. No. 60/301,249, which was filed on Jun. 26, 2001.

This patent application relates to co-pending and commonly assigned U.S. patent application Ser. No. 10/180,636 entitled "Detecting and Transporting Dynamic Presence Information Over a Wireless and Wireline Communications Network," which has the same filing date as the present application.

BACKGROUND OF THE INVENTION

Over the last couple of decades a large variety of communication devices have become available for common use. Some of these devices include the personal computer (PC), personal digital assistant (PDA) and cellular (or "wireless") telephone. The ushering in of these new devices and the coming into prominence of the Internet during the 1990s has resulted in an increased number of independent communication networks. Unfortunately, exclusivity of networks is often undesirable, especially from a consumer standpoint, since it does not allow communication across device platforms.

To address the problems associated with multiple devices on multiple networks, solutions have been sought that unify device service across multiple platforms. One emerging protocol, which is used to establish "sessions" over an Internet Protocol (IP) network, is the Session Initiation Protocol (SIP). SIP is a request-response type protocol that resembles two other Internet protocols, HTTP (Hypertext Transport Protocol, which is the underlying protocol used by the World Wide Web) and SMTP (Simple Mail Transfer Protocol, which is a protocol used to send e-mails between servers). While the development of SIP is progress in the right direction, more innovations are needed.

SUMMARY OF THE INVENTION

According to the present invention, apparatuses and methods are disclosed that enable the exchange of presence information between a wireless network and an Internet Protocol (IP) network. The exchange of presence information does not require a user-initiated session or a pre-established network connection between the wireless network and IP network. The architecture is instantiated through a gateway, which interfaces with the end user on one side and the IP network on another side.

According to an aspect of the invention, a communication gateway includes a message bearer configured to receive presence information signals from a wireless message center and a translation engine coupled to the message bearer operable to translate the presence information signals into signals capable of being transported over an Internet Protocol (IP) network.

According to another aspect of the invention, a communication gateway for communicating presence information between a connectionless packet-switched signaling network and an Internet Protocol (IP) network includes a message bearer configured to receive and send messages over a connectionless packet-switched signaling network and a translator, in communication with the message bearer, operable to translate messages received from the connectionless packet-switched signaling network into messages suitable for transport over an IP network and operable to translate messages received from the IP network into messages suitable for transport over the connectionless packet-switched signaling network.

According to another aspect of the invention, a method of communicating between a wireless packet-switched signaling network and an Internet Protocol (IP) network includes the steps of receiving a presence information signal from a wireless packet-switched signaling network and translating the received presence information signal into a signal capable of being transported over an Internet Protocol (IP) network.

Other aspects of the invention are described and claimed below, and a further understanding of the nature and advantages of the inventions may be realized by reference to the remaining portions of the specification and the attached drawings.

DETAILED DESCRIPTION

The present invention is directed at apparatuses and methods that are operable to translate a presence signal comprising presence information from a wireless network into Internet Protocol (IP) compatible signals and vice versa.

Presence information comprises near-real-time information. It may be detected, gathered and provided to other interested users by the user's interaction with an associated presence-enabled electronic device. An example of an electronic device that may be enabled for presence detection and capture is a wireless telephone. A presence-enabled wireless telephone can capture presence information of an associated end user, which might include, for example, switching on the telephone (i.e. power-on), dialing a telephone number, talking on the telephone, location of the telephone, telephone number assigned to the telephone, etc. According to the present invention, once captured, the presence information may then be automatically provided to other interested users. Other types of presence information may not be automatically provided but may, rather, require the user to first describe and then send the presence information. For example, a user may express a present desire not to be disturbed. An architecture, according to an embodiment of the present invention, which may be used to transcode streaming messages comprising presence information to signals IP-compatible signals and vice versa is described in detail below.

In an embodiment of the present invention, a bidirectional gateway translates wireless SIP-like signals comprising presence information of an end user into SIP signals for transport over an IP network and conversely translates SIP signals comprising presence information of an end user into wireless signals, which may be transported over the wireless network to a subscriber of the presence information. Although SIP format is used to describe the application layer IP protocol in this disclosure, it is to be understood that other similar application layer IP protocol, e.g. Hyper Text Transport Protocol (HTTP), may be used. Similarly, the presence information in the wireless signals may be transported according to various transport protocols, e.g. SMS (short message service), USSD (unstructured supplemental service data) and paging network protocols. Further, the wireless network may comprise, for example, any connectionless packet-switched signaling network, any two-way paging network, or any cellular network supporting cellular technologies such as GSM (global System for Global Communication), GPRS (General Packet Radio Service), CDMA (Code Division Multiple Access), TDMA (Time Division Multiple Access), W-CDMA (Wideband Code Division Multiple Access), etc. The foregoing variations apply to the figures and descriptions of the figures presented below.

Figure 1:
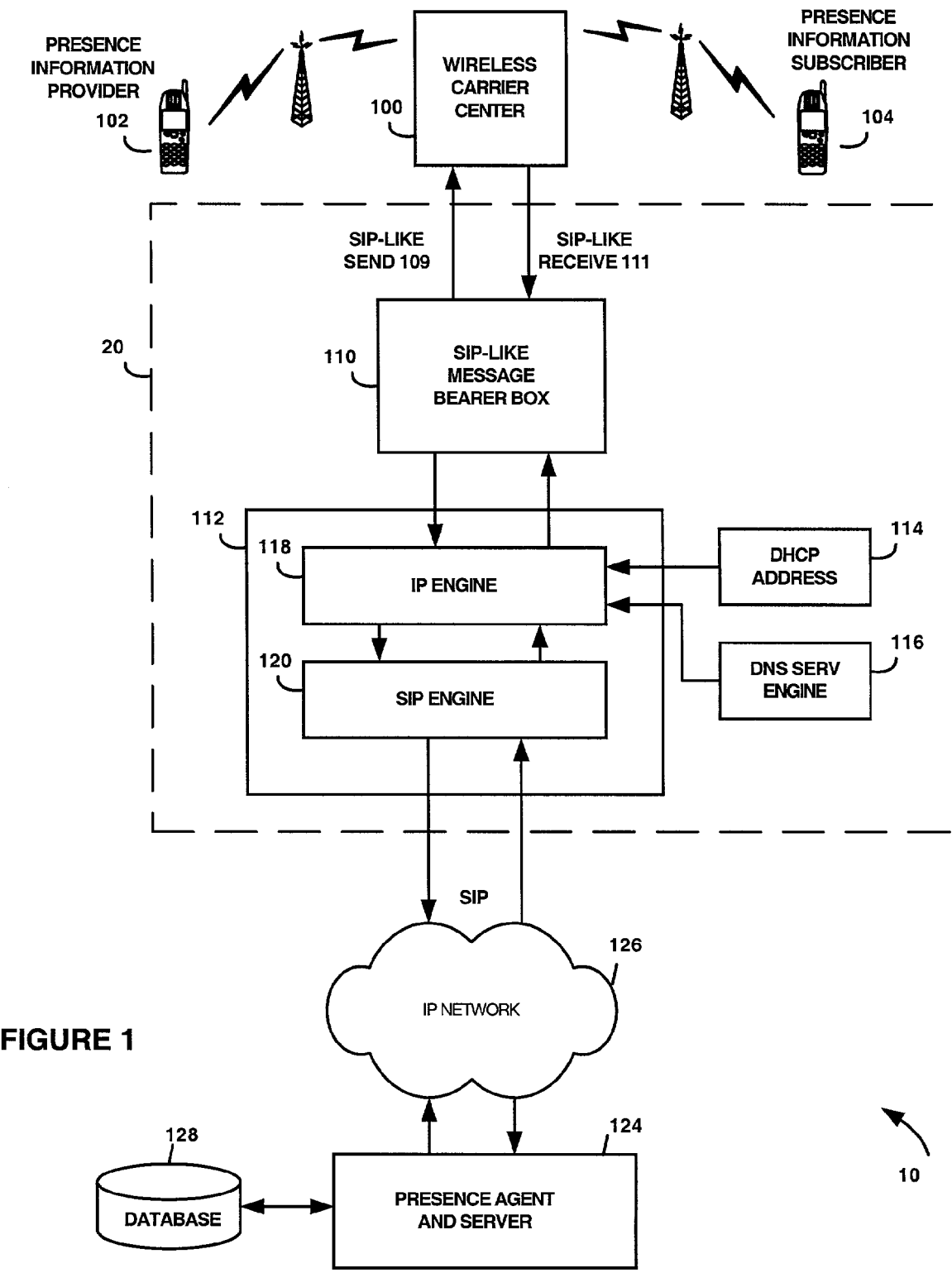
FIG. 1 shows an exemplary architectural diagram of a system that translates wireless messages to SIP-based IP signals (and vice versa), according to an embodiment of the present invention.

Referring to FIG. 1, there is shown an exemplary architectural diagram of a system 10 that translates wireless SIP-like messages, comprising presence information, into SIP signals (and vice versa), according to an embodiment of the present invention. A wireless carrier center 100 is configured to receive presence information in SIP-like format from a presence information provider 102. Only one presence information provider is shown in FIG. 1, in order to simplify illustration and explanation. In operation, many presence information providers may interact with system 10. The manner by which the presence signals are detected, captured and transported to wireless carrier center 100 is described in detail in co-pending and commonly assigned U.S. Pat. No. 10/180,636 entitled "Detecting and Transporting Dynamic Presence Information Over a Wireless and Wireline Communications Network," which is hereby incorporated by reference into this disclosure.

The presence information provider 102 may comprise a wireless telephone having an SIM card configured to detect and capture presence signals for transport to wireless carrier center 100. Alternatively, presence information provider 102 may comprise other wireless communication devices such as, for example, a personal digital assistant (PDA), laptop computer configured for wireless communication, automobile navigation system, etc. In the case of a wireless telephone, the capture of presence information is derived from the subscriber identity module (SIM) of the wireless telephone, by a proactive application programming interface call to the mobile equipment (ME) through the event driven handle. The captured presence information is then converted into an SIP-like signal payload, which is streamed over a transport layer to a wireless message center. In an exemplary embodiment, the SIP-like wireless messages are formatted according to a subset of the SIP grammar set and are transported in binary format by a presence streaming applet (PSA) layer over SMS. Further details concerning the detection and capture of presence signals and the transport of the presence signals to the wireless message center are provided in the co-pending patent application referred to above. The SIP-like wireless messages are then transmitted to a wireless message-SIP gateway 20.

Referring again to FIG. 1, wireless message-SIP gateway 20 comprises a wireless message bearer box 110, a translation engine 112 and optional DHCP address and DNS server engine components 114 and 116. Wireless message bearer box 110 is coupled to wireless carrier center 100 by message send and receive lines 109, 111, which may comprise Ethernet, TCPIP, or telephone line connections, for example. In one embodiment message bearer box 110 communicates with wireless message center 100 using SMPP (short message peer-to-peer) protocol over TCP/IP protocol.

Translation engine 112 of wireless message-SIP gateway 20 comprises an IP engine 118 and an SIP engine 120, which together operate to translate SIP-like messages received by gateway 20 into SIP messages suitable for transport over an IP network. In an exemplary embodiment, wireless SIP-like messages comprise an originating address, a destination address, a method (e.g. REGISTER, SUBSCRIBE, NOTIFY, etc., which are explained in more detail below), and message contents. IP engine 118 uses the originating address of a message received by gateway 20 to look up an associated SIP address of the presence information provider 102. (Optional DHCP address and DNS server engine components 114 and 116 operate to provide IP addresses to incoming presence signals that do not have pre-assigned IP addresses.) SIP engine 120 translates the received SIP-like message into an SIP-compliant message and then transmits it to a presence agent and server 124 via an IP network 126. As described in more detail below, presence agent and information server 124 has access to one or more databases 128, which store dynamic and static presence information of registered presence information providers and subscribers.

Whereas the architecture of system 10 in FIG. 1 above is described in the context of sending presence information from an presence information provider 102 to presence and agent server 124, via gateway 20, it is understood that gateway 20 is bi-directional and, therefore, is capable of sending presence information from the presence and agent server 124 to a user on the wireless network. Accordingly, gateway 20 also receives SIP formatted signals, translates them into SIP-like messages and sends these SIP-like signals to wireless message center 100, which transmits the SIP-like messages to presence information provider 102 or presence information subscriber 104 on a wireless network, according to the SMS transport protocol.

Now that the architecture of gateway 20 of system 10 has been described, a description of how a user interacts with system 10 will be provided. A user may comprise any entity that provides or consumes presence information received by or sent from gateway 20. So in FIG. 1, for example, both the presence information provider 102 and presence information subscriber 104 are users.

Figure 2:
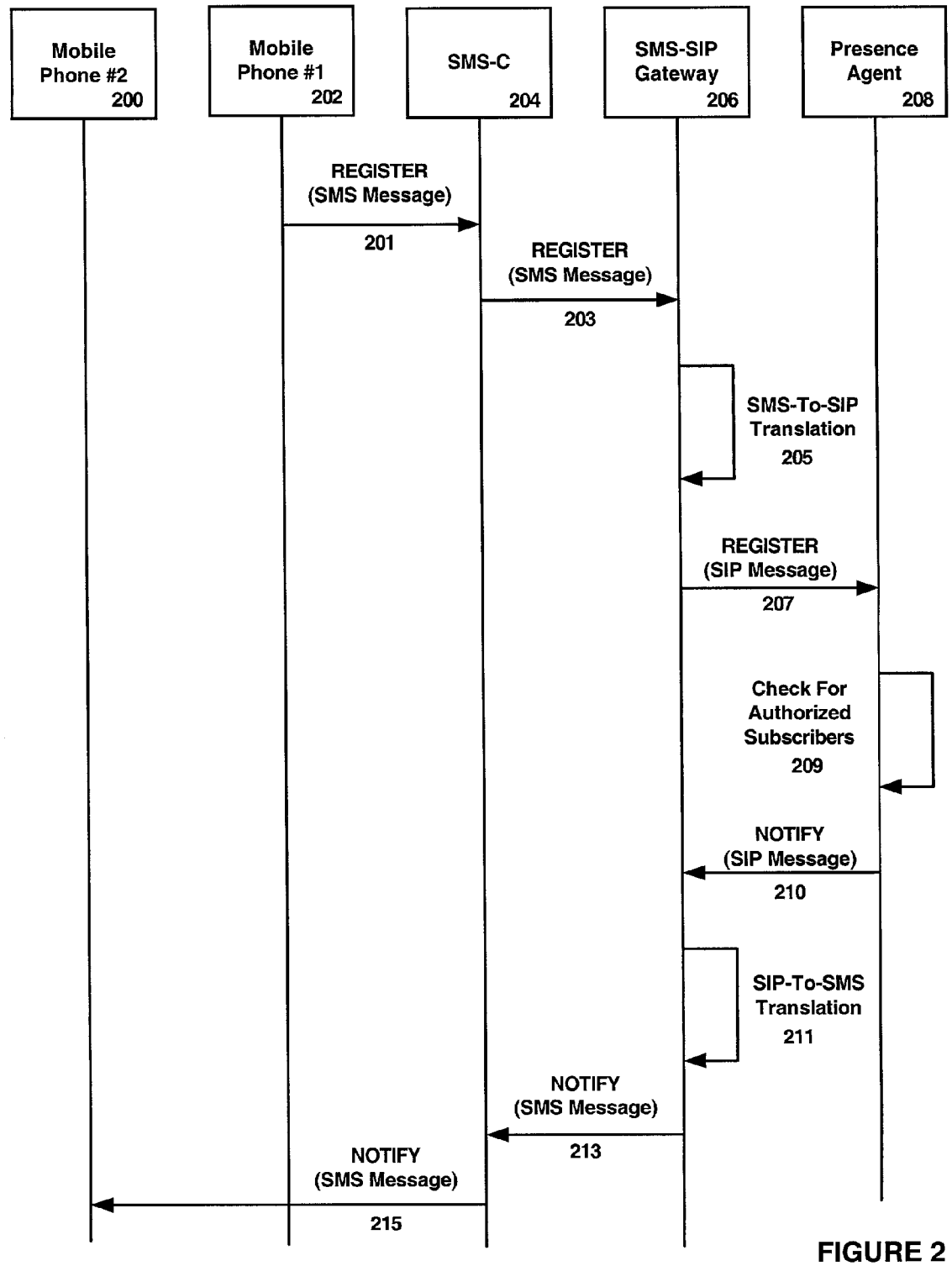
FIG. 2 is an exemplary event sequence diagram, illustrating the translating of an SMS formatted REGISTER request comprising presence information into an SIP-based signal and the translating of a NOTIFY message in SIP format to an SMS formatted signal.

Referring to FIG. 2, there is shown an event sequence diagram of a first presence-enabled device 200 associated with a first user transmitting an SIP-like REGISTER to a second presence-enabled device 202 associated with a second user, in response to the first user turning on the power of the first presence-enabled device. It is assumed in this example that the presence-enabled devices are wireless, mobile telephones and that the signaling protocol is of SIP-like signals transported over an SMS transport protocol. Other device types and signaling and transport protocols may be used, as described above.

When the power of the first mobile phone 200 is turned on, presence signal software resident on the API of the phone's SIM card detects and captures the power on event as presence information. First mobile phone 200 sends an SMS message comprising the presence information to a wireless message center (SMS-C) 204, as indicated by event 201. The SMS message comprises an origination address, an optional destination address, a method (i.e. REGISTER, in this example) and optional message content. The origination and destination addresses, in this example, comprise the telephone number assigned to the first and second mobile phones 200 and 202, respectively. SMS-C 204 delivers the SMS message to a wireless message-SIP gateway (SMS-SIP gateway) 206, as indicated by event 203. In a specific exemplary embodiment, SMS-C 204 sends the message using SMPP over TCP/IP protocol. SMS-SIP gateway 206 then performs a process 205, which comprises operating on the SMS message to translate it to an SIP formatted message. After the translation process is completed, SMS-SIP gateway 206 sends the translated message to a presence agent and server 208, via an IP network, as indicated by event 207.

Upon receiving the SIP formatted REGISTER, presence agent and server 208 performs a process 209, which checks whether any authorized users (i.e. authorized subscribers) may be interested in receiving the presence information of the first user. From the power on signal and the operating base station identifier of the wireless network, an interested subscriber can, for example, be informed of the first user's physical presence. If presence agent and server 208 determines that a second user has expressed an interest in the presence attributes of the first user or has previously subscribed to the first user's presence information, the second user is notified as follows.

First, an SIP formatted NOTIFY message is generated by presence agent and server 208 and sent to SMS-SIP gateway 206, as indicated by event 210 in FIG. 2. Upon receiving the SIP formatted NOTIFY message, SMS-SIP gateway 206 performs a process 211, which comprises operating on the SIP formatted NOTIFY message to translate it to an SMS formatted message containing the NOTIFY message. The SMS-SIP gateway 206 then sends the SMS formatted message to SMS-C 204, as indicated by event 213. Finally, the SMS-C sends the SMS NOTIFY message to the second mobile phone 202 associated with the destination address, as indicated by event 215. Note that if no destination address is provided by the first user, but the second user is otherwise subscribed to the first user's presence information, the destination address is provided from an alternative source, e.g. from database 128 in the architecture shown in FIG. 1.

In the above exemplary REGISTER event sequence, the REGISTER request is automatically sent after the user powered on mobile phone 200. Other types of automatic REGISTER event sequences could provide presence information, for example, of the user's physical location by the identification number of the associated mobile phone or by a device that is GPS (Global Position Satellite)-enabled. In another aspect of the invention, a user may REGISTER presence attributes through a gateway (e.g. through wireless message-SIP gateway 20 in FIG. 1 using a REGISTER event sequence similar to that shown in FIG. 2). The presence attributes may describe other presence information of the user, capabilities of an associated device, preferences (e.g. language preference) of the user, etc. A specific example is of a user who wishes to provide a presence "status", indicating whether the user is free, busy or does not want to be disturbed. The REGISTER request made by the user is similar to that shown in FIG. 2, except that the user provides the necessary parameters to implement the request.

Figure 3:
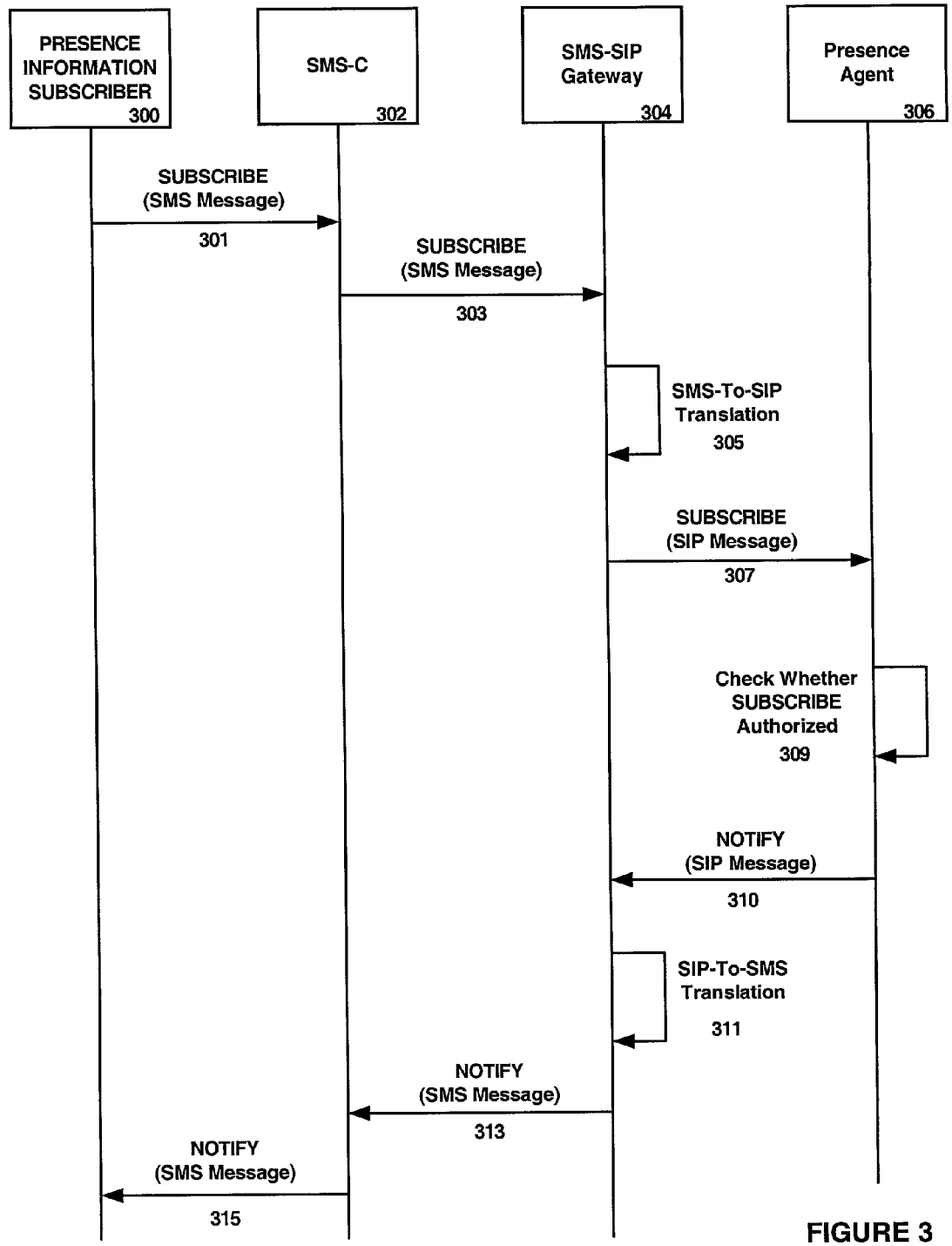
FIG. 3 is an exemplary event sequence diagram, illustrating the translating of an SMS formatted SUBSCRIBE request of a presence information subscriber into an SIP-based signal and the translating of a NOTIFY message in SIP format to an SMS formatted signal.

Referring now to FIG. 3, there is shown an event sequence diagram of a presence information subscriber 300 (e.g., which may correspond to presence information subscriber 104 in FIG. 1) making a SUBSCRIBE request for access to presence information of one or more other users. Similar to the REGISTER example described above, it is assumed for purpose of example, that the SUBSCRIBE request is sent as an SMS message from a wireless device associated with the presence information subscriber 300. Software resident on the API of the wireless device's SIM card detects and captures the SUBSCRIBE request. The wireless device of the presence information subscriber 300 sends an SMS message comprising the SUBSCRIBE request to a wireless message center (SMS-C) 302, as indicated by event 301. The SMS message comprises an origination address, a method (i.e. SUBSCRIBE in this example) and message content. The origination address may comprise, for example, a telephone number of the wireless device associated with presence information subscriber 300. The SMS-C 302 delivers the SMS message to an SMS-SIP gateway 304, as indicated by event 303. SMS-SIP gateway 304 then performs a process 305, which comprises operating on the SMS message to translate it to an SIP formatted message. After the translation process is completed, SMS-SIP gateway 304 sends the translated message to a presence and agent server 306, via an IP network, as indicated by event 307.

Upon receiving the SIP formatted SUBSCRIBE request, presence and agent server 306 performs a process 309 to determine whether the SUBSCRIBE request is to be accepted or denied. If accepted, the message contents of the message (i.e. subscription data) are stored on a data storage device coupled to presence agent and server 306. In response to receiving the SUBSCRIBE request, presence agent and server 306 generates an SIP formatted NOTIFY message and send it to SMS-SIP gateway 304, as indicated by event 310. The NOTIFY message may indicate, for example, that the SUBSCRIBE request was accepted or denied. Then, the SMS-SIP gateway 304 performs a process 311, which comprises operating on the SIP formatted NOTIFY message to translate it to an SMS formatted message containing the NOTIFY message. The SMS-SIP gateway 304 then sends the SMS formatted message to SMS-C 302, as indicated by event 313. Finally, the SMS-C 302 sends the SMS NOTIFY message back to the wireless device of the presence information subscriber, as indicated by event 315.

Whereas the above is a complete description of the preferred embodiments of the invention, various alternatives, modifications, and equivalents may be used. Therefore, the above description should not be taken as limiting the scope of the invention, which is defined by the appended claims.

What is claimed is:

1. A communication gateway, comprising:
   a message bearer configured to receive presence information signals that are generated based upon one or more presence attributes of a wireless device and a personal state of a user, the presence attributes including dynamic information related to an audio communication session of the wireless device; and
   a translation engine coupled to the message bearer operable to translate the presence information signals into signals capable of being transported over an Internet Protocol (IP) network and automatically provide the presence information signals to one or more other wireless devices.

2. The communication gateway of claim 1, wherein the presence information signals are derived from wireless signals sent from the wireless device without user input on a wireless network, said wireless signals comprising Short Message Service (SMS) formatted signals and said wireless network comprising a connectionless packet-switched signaling network.

3. The communication gateway of claim 1, wherein the presence information signals are derived from wireless signals sent without user input from the wireless device on a wireless network, said wireless signals comprising Unstructured Supplemental Service Date (USSD) formatted signals and said wireless network comprising a connectionless packet-switched signaling network.

4. The communication gateway of claim 1, wherein the protocol capable of transporting the presence information signals over the IP network comprises Session Initiation Protocol (SIP).

5. The communication gateway of claim 1, wherein the protocol capable of transporting the presence information signals over the IP network comprises Hyper Text Transport Protocol (HTTP).

6. The communication gateway of claim 4, wherein the translation engine further comprises:
 a IP engine operable to extract an originating address from the presence information signals; and
 a SIP engine operable to translate the presence information signals to IP protocol signals.

7. The communication gateway of claim 5, wherein the translation engine further comprises:
 an IP engine operable to extract an originating address from the presence information signals; and
 a HTTP engine operable to translate the presence information signals to Session Initiation Protocol (SIP) protocol signals.

8. The communication gateway of claim 1, wherein the presence information signals include presence information of a presence information provider.

9. The communication gateway of claim 8, wherein the presence information provider comprises:
 a human user, who is associated with the presence signals received by the message bearer from the wireless device; and
 a presence-enabled electronic device.

10. The communication gateway of claim 1, wherein the message bearer is further configured to receive presence signal information from the translation engine.

11. The communication gateway of claim 10, wherein the translation engine is further operable to receive SIP formatted signals from the IP network and translate the SIP formatted signals into signals capable of being formatted and transmitted by the message bearer.

12. The communication gateway of claim 10, wherein the translation engine is further operable to receive HTTP formatted signals from the IP network and translate the HTTP formatted signals into signals capable of being formatted and transmitted by the message bearer.

13. The communication gateway of claim 1, wherein the dynamic information related to the audio communication session of the wireless device indicates that the audio communication session of the wireless device is in progress.

14. The communication gateway of claim 1, wherein the dynamic information related to the audio communication session of the wireless device indicates that the audio communication session is being entered from the wireless device.

15. The communication gateway of claim 1, wherein the audio communication session is a telephone call.

16. A method of communicating between a network and an Internet Protocol (IP) network, comprising the steps of:
 generating a presence information signal that is based upon one or more presence attributes of a wireless device and a personal state of a user, the presence attributes including dynamic information related to an audio communication session of the wireless device;
 sending the presence information signal to a network; and
 translating the received presence information signal into a signal capable of being transported over an Internet Protocol (IP) network and automatically provide the presence information signals to one or more other wireless devices.

17. The method according to claim 16, wherein the protocol capable of transporting the presence information signal over the IP network comprises Session Initiation Protocol (SIP).

18. The method according to claim 16, wherein the protocol capable of transporting the presence information signal over the IP network comprises hyper Text Transport Protocol (HTTP).

19. The method according to claim 16, wherein the step of translating further comprises the step of determining an originating address of the presence information signal received from the network.

20. The method according to claim 16, wherein the presence information signal comprises a REGISTER request of a presence information provider.

21. The method of claim 17, further comprising the step of transporting the SIP formatted signal to a presence agent.

22. The method of claim 18, further comprising the step of transporting the HTTP formatted signal to a presence agent.

23. The method of claim 21, further comprising the step of storing presence information of the presence information signal on a database coupled to the presence agent.

24. The method of claim 22, further comprising the step of storing presence information of the presence information signal on a database coupled to the presence agent.

25. The method of claim 21, further comprising the steps of:
 determining whether any presence information subscribers are authorized to receive the presence information signal; and
 sending a NOTIFY message to an authorized subscriber.

26. The method of claim 22, further comprising the steps of:
 determining whether any presence information subscribers are authorized to receive the presence information signal; and
 sending a NOTIFY message to an authorized subscriber.

27. The method of claim 25, wherein the step of sending a NOTIFY message comprises the steps of:
 translating an SIP formatted NOTIFY message into a format capable of being transported over a connectionless packet-switched signaling network; and
 sending the NOTIFY message to the authorized subscriber.

28. The method of claim 26, wherein the step of sending a NOTIFY message comprises the steps of:
 translating an HTTP formatted NOTIFY message into a format capable of being transported over a connectionless packet-switched signaling network; and
 sending the NOTIFY message to the authorized subscriber.

29. A communication gateway for communicating presence information between a connectionless packet-switched signaling network and an Internet Protocol (IP) network, comprising:
 a message bearer configured to receive and send messages over a connectionless packet-switched signaling network; and
 a translator, in communication with the message bearer, operable to translate messages received from the connectionless packet-switched signaling network into messages suitable for transport over an IP network and operable to translate messages received from the IP network into messages suitable for transport over the connectionless packet-switched signaling network, wherein:

at least some of the messages received by the message bearer comprise presence information signals that are based upon one or more presence attributes of a wireless communications device and a personal state of a user, the presence attributes including dynamic information related to an audio communication session of the wireless communications device, and the wireless communications devices are in communication with the connectionless packet-switched signaling network.

30. The communication gateway of claim 29, wherein the messages received by and sent from the message bearer comprise Short Message Service (SMS) messages.

31. The communication gateway of claim 29, wherein the messages transported over the IP network comprise SIP formatted messages.

32. The communication gateway of claim 29, wherein the messages transported over the IP network comprise HTTP formatted messages.

33. A communication gateway for communicating presence information between a connectionless packet-switched signaling network and an Internet Protocol (IP) network, comprising:

message bearer means for receiving and sending messages over a connectionless packet-switched signaling network; and translating means, in communication with the message bearer means, for translating messages received from the connectionless packet-switched signaling network into messages suitable for transport over an IP network and for translating messages received from the IP network into messages suitable for transport over the connectionless packet-switched signaling network, wherein:

at least some of the messages received by the message bearer means comprise presence information signals that are generated based upon one or more presence attributes of a wireless communications device and a personal state of a user, the presence attributes including dynamic information related to an audio communication session of the wireless communications device, and the wireless communications device being in communication with the connectionless packet-switched signaling network.

34. The communication gateway of claim 33, wherein the messages received by and sent from the message bearer means comprise presence information of a user of the connectionless packet-switched signaling network.

35. The communication gateway of claim 34, wherein the messages received by and sent from the message bearer means comprise Short Message Service (SMS) messages.

36. The communication gateway of claim 34, wherein the messages transported over the IP network comprise SIP formatted messages.

37. The communication gateway of claim 34, wherein the messages transported over the IP network comprise HTTP formatted messages.

38. A communication system, comprising:

a message bearer configured to receive and send messages over a connectionless packet- switched signaling network; and a translator, in communication with the message bearer, operable to translate messages received from the connectionless packet-switched signaling network into messages suitable for transport over an IP network and operable to translate messages received from the IP network into messages suitable for transport over the connectionless packet-switched signaling network; and a presence agent and server coupled to the IP network operable to provide and store information contained in the messages transported over the IP network, wherein:

at least some of the information stored on the presence agent and server comprises presence information that is generated based upon one or more attributes of a wireless communications device and a personal state of a user, the attributes including dynamic information related to an audio communication session of the wireless communications device.

39. The communication system of claim 38, wherein the information provided and stored by the presence agent and server comprises presence information.

40. The communication system of claim 38, wherein the messages received by and sent from the message bearer comprise presence information of a user of the connectionless packet-switched signaling network.

41. The communication gateway of claim 40, wherein the messages received by and sent from the message bearer comprise Short Message Service (SMS) messages.

42. The communication gateway of claim 40, wherein the messages transported over the IP network comprise SIP formatted messages.

43. The communication gateway of claim 40, wherein the messages transported over the IP network comprise HTTP formatted messages.

44. A computer readable medium having processor readable code for directing one or more processors to perform a method of:

detecting dynamic presence information associated with an electronic device, said dynamic presence information being based on one or more presence attributes of the electronic device and a personal state of a user, the presence attributes including dynamic information related to an audio communication session of the electronic device;

generating a presence information signal based on the dynamic presence information; and automatically transmitting the presence information signal to a network.

45. A communication gateway, comprising:

a message bearer configured to receive presence information signals, said presence information signals including:

first information generated by a wireless device describing the state of the wireless device or the personal state of a user, the first information including dynamic information related to an audio communication session of the wireless device, and second information describing parameters provided by the user that identify a configuration of the wireless device; and a translation engine coupled to the message bearer operable to:

translate the presence information signals into signals capable of being transported over an Internet Protocol network, and provide the first information describing the state of the wireless device or the personal state of the user to one or more other wireless devices based on the second information.

* * * * *